(12) United States Patent
Shaath et al.

(10) Patent No.: US 8,782,009 B2
(45) Date of Patent: Jul. 15, 2014

(54) METHOD AND SYSTEM FOR ELECTRONIC FILE LIFECYCLE MANAGEMENT

(75) Inventors: Kamel Shaath, Kanata (CA); Fu Yaqun, Nepean (CA); Vinay Parthasarathy, Ottawa (CA); Alexei Jelvis, Nepean (CA); Abel Liyansky, Ottawa (CA)

(73) Assignee: KOM Networks Inc., Kanata, Ontario (CA)

( * ) Notice: Subject to any disclaimer, the term of this patent is extended or adjusted under 35 U.S.C. 154(b) by 152 days.

(21) Appl. No.: 12/213,670

(22) Filed: Jun. 23, 2008

(65) Prior Publication Data

US 2008/0263112 A1 Oct. 23, 2008

Related U.S. Application Data

(60) Division of application No. 09/665,065, filed on Sep. 19, 2000, now Pat. No. 7,392,234, which is a continuation-in-part of application No. 09/313,181, filed on May 18, 1999, now Pat. No. 6,438,642.

(51) Int. Cl.
G06F 7/00 (2006.01)
G06F 17/00 (2006.01)

(52) U.S. Cl.
USPC ............ 707/661; 707/662; 707/663; 707/665

(58) Field of Classification Search
USPC ........... 707/661, 662, 663, 665, 668, 999.204
See application file for complete search history.

(56) References Cited

U.S. PATENT DOCUMENTS

| 4,104,718 | A | 8/1978 | Poublan et al. |
| 4,825,354 | A | 4/1989 | Agrawal et al. |
| 4,887,204 | A | 12/1989 | Johnson et al. |
| 4,914,571 | A | 4/1990 | Baratz et al. |
| 4,989,206 | A | 1/1991 | Dunphy, Jr. et al. |
| 4,993,030 | A | 2/1991 | Krakauer |
| 5,008,853 | A | 4/1991 | Bly |
| 5,029,199 | A | 7/1991 | Jones et al. |
| 5,095,423 | A | 3/1992 | Gramlich et al. |
| 5,163,147 | A | 11/1992 | Orita |

(Continued)

FOREIGN PATENT DOCUMENTS

| EP | 0515073 A | 11/1992 | |
| WO | WO 0058865 A1 * | 10/2000 | ............... G06F 17/30 |

OTHER PUBLICATIONS

Gable, "Records Management for Electronic Documents", ARMA Records Management Quarterly, vol. 31, No. 4, Oct. 1997, pp. 15-19.

(Continued)

*Primary Examiner* — Hares Jami
(74) *Attorney, Agent, or Firm* — ATFirm PLLC; Ralph P. Albrecht

(57) ABSTRACT

A method and system for managing a file lifecycle is disclosed. The method incorporates a virtual file cabinet having virtual drawers. Files are moved from drawer to drawer throughout their lifecycle in accordance with policies associated with each drawer. The files are moved automatically and as such, a file's lifecycle is managed from file creation to file deletion in an automated fashion. By using an archiving device such as magneto optical storage media, the files are automatically moved to their final archived location in an archiving drawer once certain policies of their present drawer are met. The system is an electronic system employing the inventive method.

44 Claims, 7 Drawing Sheets

(56) References Cited

U.S. PATENT DOCUMENTS

| | | |
|---|---|---|
| 5,193,184 A | 3/1993 | Belsan et al. |
| 5,222,242 A | 6/1993 | Choi et al. |
| 5,276,867 A | 1/1994 | Kenley et al. |
| 5,287,504 A | 2/1994 | Carpenter et al. |
| 5,313,631 A | 5/1994 | Kao |
| 5,317,728 A | 5/1994 | Tevis et al. |
| 5,347,628 A | 9/1994 | Brewer et al. |
| 5,367,698 A | 11/1994 | Webber et al. |
| 5,377,323 A | 12/1994 | Vasudevan |
| 5,379,423 A | 1/1995 | Mutoh et al. |
| 5,408,630 A | 4/1995 | Moss |
| 5,425,028 A | 6/1995 | Britton et al. |
| 5,434,974 A | 7/1995 | Loucks et al. |
| 5,455,926 A | 10/1995 | Keele |
| 5,493,607 A | 2/1996 | Arumainayagam et al. |
| 5,495,619 A | 2/1996 | May et al. |
| 5,509,120 A | 4/1996 | Merkin |
| 5,542,045 A | 7/1996 | Levine |
| 5,548,521 A | 8/1996 | Krayer |
| 5,579,507 A | 11/1996 | Arai et al. |
| 5,584,008 A | 12/1996 | Shimada et al. |
| 5,644,766 A | 7/1997 | Cabrera et al. |
| 5,649,095 A | 7/1997 | Cozza |
| 5,675,787 A | 10/1997 | Miller et al. |
| 5,678,014 A | 10/1997 | Malamud et al. |
| 5,689,662 A | 11/1997 | Nakajima et al. |
| 5,689,700 A | 11/1997 | Miller et al. |
| 5,701,462 A | 12/1997 | Whitney et al. |
| 5,751,287 A | 5/1998 | Hahn |
| 5,768,532 A | 6/1998 | Megerian |
| 5,771,354 A | 6/1998 | Crawford |
| 5,778,384 A | 7/1998 | Provino et al. |
| 5,793,970 A | 8/1998 | Fakes et al. |
| 5,832,522 A | 11/1998 | Blickenstaff et al. |
| 5,838,326 A | 11/1998 | Card et al. |
| 5,842,214 A | 11/1998 | Whitney et al. |
| 5,862,331 A | 1/1999 | Herriot |
| 5,881,229 A | 3/1999 | Singh et al. |
| 5,884,033 A | 3/1999 | Duvall et al. |
| 5,893,139 A | 4/1999 | Kamiyama |
| 5,909,540 A | 6/1999 | Carter et al. |
| 5,918,229 A | 6/1999 | Davis et al. |
| 5,919,257 A | 7/1999 | Trostle |
| 5,923,848 A | 7/1999 | Goodhand et al. |
| 5,936,624 A | 8/1999 | Lisle et al. |
| 5,946,685 A | 8/1999 | Cramer et al. |
| 5,950,203 A | 9/1999 | Stakuis |
| 5,956,481 A | 9/1999 | Walsh et al. |
| 5,969,720 A | 10/1999 | Lisle et al. |
| 5,978,815 A | 11/1999 | Cabrera |
| 5,987,506 A | 11/1999 | Carter et al. |
| 5,987,610 A | 11/1999 | Franczek |
| 5,991,753 A | 11/1999 | Wilde |
| 5,991,777 A | 11/1999 | Momoh et al. |
| 6,023,744 A | 2/2000 | Shoroff et al. |
| 6,026,402 A | 2/2000 | Vossen et al. |
| 6,088,803 A | 7/2000 | Bakshi et al. |
| 6,091,409 A | 7/2000 | Dickman et al. |
| 6,101,506 A | 8/2000 | Ukai et al. |
| 6,148,369 A | 11/2000 | Ofer et al. |
| 6,195,650 B1 | 2/2001 | Gaither et al. |
| 6,240,414 B1 | 5/2001 | Beizer et al. |
| 6,240,421 B1 * | 5/2001 | Stolarz ............... 707/102 |
| 6,249,866 B1 | 6/2001 | Brundett et al. |
| 6,256,031 B1 | 7/2001 | Meijer et al. |
| 6,266,679 B1 | 7/2001 | Szalwinski et al. |
| 6,266,774 B1 | 7/2001 | Sampath et al. |
| 6,269,382 B1 | 7/2001 | Cabrera et al. |
| 6,292,844 B1 | 9/2001 | Smyers et al. |
| 6,349,313 B1 | 2/2002 | Momoh et al. |
| 6,356,915 B1 | 3/2002 | Chtchetkine |
| 6,363,400 B1 | 3/2002 | Chtchetkine et al. |
| 6,366,987 B1 * | 4/2002 | Tzelnic et al. ........... 711/162 |
| 6,366,988 B1 | 4/2002 | Skiba |
| 6,374,327 B2 | 4/2002 | Sakaki et al. |
| 6,381,619 B1 | 4/2002 | Borowsky et al. |
| 6,389,432 B1 | 5/2002 | Pothapragada et al. |
| 6,415,280 B1 * | 7/2002 | Farber et al. ........... 707/698 |
| 6,438,642 B1 | 8/2002 | Shaath et al. |
| 6,453,345 B2 | 9/2002 | Trcka et al. |
| 6,577,920 B1 | 6/2003 | Hyppnen |
| 6,594,675 B1 | 7/2003 | Schneider |
| 6,647,393 B1 | 11/2003 | Dietterich et al. |
| 6,654,830 B1 | 11/2003 | Taylor et al. |
| 6,697,846 B1 | 2/2004 | Soltis |
| 6,714,513 B1 | 3/2004 | Joiner et al. |
| 6,745,207 B2 | 6/2004 | Reuter et al. |
| 6,754,696 B1 | 6/2004 | Kamath et al. |
| 6,754,705 B2 | 6/2004 | Joiner et al. |
| 6,778,346 B2 | 8/2004 | Takayama et al. |
| 6,789,117 B1 | 9/2004 | Joiner et al. |
| 6,801,902 B1 | 10/2004 | David |
| 6,845,431 B2 | 1/2005 | Camble et al. |
| 6,847,968 B2 | 1/2005 | Pitts |
| 6,892,227 B1 | 5/2005 | Elwell et al. |
| 6,892,264 B2 | 5/2005 | Lamb |
| 6,941,358 B1 | 9/2005 | Joiner et al. |
| 6,950,723 B2 | 9/2005 | Gallo et al. |
| 6,971,018 B1 | 11/2005 | Witt |
| 7,007,048 B1 | 2/2006 | Murray et al. |
| 7,024,427 B2 | 4/2006 | Bobbitt et al. |
| 7,054,927 B2 | 5/2006 | Ulrich et al. |
| 7,058,772 B2 | 6/2006 | Kuwabara et al. |
| 7,062,783 B1 | 6/2006 | Joiner |
| 7,069,380 B2 | 6/2006 | Ogawa et al. |
| 7,113,948 B2 | 9/2006 | Jhingan et al. |
| 7,154,857 B1 | 12/2006 | Joiner et al. |
| 7,155,466 B2 | 12/2006 | Rodriguez et al. |
| 7,171,532 B2 | 1/2007 | Kodama |
| 7,185,028 B2 | 2/2007 | Lechner |
| 7,233,959 B2 | 6/2007 | Kanellos et al. |
| 7,293,131 B2 | 11/2007 | Ogawa et al. |
| 7,308,544 B2 | 12/2007 | Kuwabara et al. |
| 7,313,633 B2 | 12/2007 | Beverly |
| 7,380,064 B2 | 5/2008 | Ishii et al. |
| 7,505,980 B2 | 3/2009 | Tyndall |
| 7,519,783 B2 | 4/2009 | Kuwabara et al. |
| 7,529,903 B2 | 5/2009 | Boss et al. |
| 7,552,300 B2 | 6/2009 | Man et al. |
| 7,584,190 B2 | 9/2009 | Lechner |
| 7,614,058 B2 | 11/2009 | Pan et al. |
| 7,660,946 B2 | 2/2010 | Watanabe et al. |
| 7,669,026 B2 | 2/2010 | Boss et al. |
| 7,752,384 B2 | 7/2010 | Moody, II et al. |
| 7,822,928 B2 | 10/2010 | Ishii et al. |
| 7,856,424 B2 | 12/2010 | Cisler et al. |
| 7,870,104 B2 | 1/2011 | Fujii et al. |
| 7,921,268 B2 | 4/2011 | Jakob |
| 7,930,493 B1 | 4/2011 | McGovern et al. |
| 7,941,597 B2 | 5/2011 | Moody, II et al. |
| 7,971,019 B2 | 6/2011 | Tyndall et al. |
| 8,290,808 B2 | 10/2012 | Brower, Jr. |
| 8,396,838 B2 | 3/2013 | Brockway et al. |
| 2002/0030100 A1 | 3/2002 | Katayanagi et al. |
| 2002/0035696 A1 | 3/2002 | Thacker |
| 2002/0046320 A1 | 4/2002 | Shaath |
| 2002/0069214 A1 | 6/2002 | Smith et al. |
| 2002/0070971 A1 | 6/2002 | Brown et al. |
| 2002/0111956 A1 | 8/2002 | Yeo et al. |
| 2003/0039148 A1 | 2/2003 | Reidle |
| 2004/0107417 A1 | 6/2004 | Chia et al. |
| 2004/0133608 A1 | 7/2004 | Everson et al. |
| 2004/0193760 A1 | 9/2004 | Matsunami et al. |
| 2005/0055211 A1 | 3/2005 | Claudatos et al. |
| 2005/0065961 A1 | 3/2005 | Aguren |
| 2005/0108393 A1 | 5/2005 | Banerjee et al. |
| 2005/0119994 A1 | 6/2005 | Matsunami et al. |
| 2005/0201297 A1 | 9/2005 | Peikari |
| 2005/0203964 A1 | 9/2005 | Matsunami et al. |
| 2005/0216762 A1 | 9/2005 | Peikari |
| 2005/0246386 A1 | 11/2005 | Sullivan et al. |
| 2006/0004818 A1 | 1/2006 | Claudatos et al. |
| 2006/0004820 A1 | 1/2006 | Claudatos et al. |
| 2006/0004847 A1 | 1/2006 | Claudatos et al. |

(56) References Cited

U.S. PATENT DOCUMENTS

| | | |
|---|---|---|
| 2006/0004868 A1 | 1/2006 | Claudatos et al. |
| 2006/0010241 A1 | 1/2006 | Kudallur et al. |
| 2006/0059172 A1 | 3/2006 | Devarakonda |
| 2006/0165002 A1 | 7/2006 | Hicks et al. |
| 2006/0230086 A1 | 10/2006 | Devarakonda et al. |
| 2006/0245371 A1 | 11/2006 | Joiner et al. |
| 2006/0259901 A1 | 11/2006 | Kaplan |
| 2007/0055715 A1 | 3/2007 | Achiwa |
| 2007/0094312 A1 | 4/2007 | Sim-Tang |
| 2007/0185934 A1 | 8/2007 | Cannon et al. |
| 2007/0260640 A1 | 11/2007 | Hamilton et al. |
| 2007/0271306 A1 | 11/2007 | Brown et al. |
| 2008/0002830 A1 | 1/2008 | Cherkasov et al. |
| 2008/0046563 A1 | 2/2008 | Banerjee et al. |
| 2008/0060080 A1 | 3/2008 | Lim |
| 2008/0120465 A1 | 5/2008 | Brannon et al. |
| 2008/0133719 A1 | 6/2008 | Amitai et al. |

OTHER PUBLICATIONS

The Gale Group, "Documentum Launches EDMA 98", PR Newswire, Jul. 1998.

Schoeniger, "Data pecking order," DEC Professional, vol. 13, No. 1, Jan. 1994, pp. 24-33.

Baird et al., "Distributed Information Storage Architecture", Mass Storage Systems, 1993, Putting All That Data to Work; Proceedings, Twelfth IEEE Symposium in Monterey, California, Apr. 26-29, 1993, Los Alamitos, California, IEEE Comput. Soc., US, Apr. 26, 1993, pp. 145-155.

Foster et al., "Renaissance: managing the network computer and its storage requirements", Proceedings of the Symposium on Mass Storage Systems, Monterey, Oct. 7-10, 1991; Los Alamitos, IEEE Comp. Soc. Press, US, vol. Symp. 11, Oct. 7, 1991; pp. 3-10.

Bedoll el al., "The importance of metadata in mass-storage systems", Mass Storage Systems, 1990, Crisis in Mass Storage. Digest of Papers; Tenth IEEE Symposium in Monterey, California, May 7-10, 1990, Washington, DC, USA; IEEE Comput. Soc. PR, US, May 7, 1990, pp. 111-116.

Lanzatella, et al., "Storage Management Issues for Cray Research," Mass Storage Systems, 1990, Crisis in Mass Storage. Digest of Papers; Tenth IEEE Symposium in Monterey, California, May 7-10, 1990, Washington DC, USA; IEEE Comput. Soc. PR, US, May 7, 1990, pp. 176-181.

J. Gait, "The Optical File Cabinet: A Random-Access File System for Write Once Optical Disks," Computer, Jun. 1988, pp. 11-22.

J. Gait, "Phoenix: A Safe In-Memory File System," Communications of ACM, vol. 33, No. 1, Jan. 1990, pp. 81-86.

J. Gait, "A Checkpointing Page Store for Write-Once Optical Disk," IEEE Transactions on Computers, vol. 39, No. 1, Jan. 1990, pp. 2-9.

T. Laskodi et al., "A UNIX File System for a Write-Once Optical Disc," Summer Usenix '88, San Francisco, Jun. 20-24, pp. 51-60.

G. Mangold, "Basic architecture of HSM sets it apart from backup", Computer Technology Review, Fall 1994, p. 58.

D. Uvelli, "The role of tape-based storage in Storage Area Networks", Computer Technology Review, Jun. 2000, p. 56.

Anonymous, "Daticon Systems unveils Dati-Share, Virtual Partner", Information Today, vol. 16, No. 2, Feb. 1999, p. 54.

Edjlali, Guy, Acharya, Anurag, and Chaudhary, Vipin, "History-based Access Control for Mobile Code," CCS'98 Proceedings of the 5th ACM conference on Computer and Communications Security, ACM, NY, NY, 1998.

Harry, Michael, Del Rosario, Juan Miguel, Choudhary, Alok, "VIP-FS: A Virtual, Parallel File System for High Performance Parallel and Distributed Computing," Proceedings of the 9th International Parallel Processing Sympsosium (IPPS'95), IEEE,1995.

* cited by examiner

METHOD AND SYSTEM FOR ELECTRONIC FILE LIFECYCLE MANAGEMENT

CROSS-REFERENCE TO RELATED APPLICATIONS

This is a divisional of U.S. application Ser. No. 09/665,065, filed Sep. 19, 2000, and issued on Jun. 24, 2008 as U.S. Pat. No. 7,392,234, which is a continuation-in-part of U.S. application Ser. No. 09/313,181, filed on May 18, 1999, and issued on Aug. 1, 2002, as U.S. Pat. No. 6,438,642.

FIELD OF THE INVENTION

The invention relates generally to storage devices for storing electronic data and more particularly to virtual storage devices for electronic file lifecycle management.

BACKGROUND OF THE INVENTION

In the past, files were stored as paper documents within a physical file. A physical file has a physical lifecycle from file creation to file destruction. Commonly, during this process, the file goes through the process of file building, file reference, file non-use, and file archiving. These steps often occur in that order though this need not be the case.

Because of the way files are maintained within present day computer systems, it is often difficult to retrieve files when lost. This is not because of backup failures and so forth, so much as due to poor organization and non-standard file lifecycle management. Typically, files are relocated manually which necessitates human interaction and the new location of the file has to be manually recorded. This process is prone to errors since it relies heavily on the individual to update the current location. For example, it is often only a guess when a specific file is archived. The name and location of the file may also be inexact. This leads to difficulties in accessing data once archived. It also leads to difficulty in accessing data during normal use.

The adoption of the concept of electronic file storage has increased the demand for storage on an ongoing basis. Huge networked storage repositories, which were once considered as unattainable, are now more widely available. The potential existence of such systems raises many questions of how to organize and coordinate where the files will be stored and for how long. These issues have plagued system administrators through out the evolution of the electronic age, and will continue in the future as the demand for electronic data increases. In most organizations their storage requirements are evolving at an exponential rate exceeding all expectations. This phenomenon along with the ongoing advancements in storage technologies that are occurring at a very fast rate are making existing storage repositories obsolete shortly after their deployment.

OBJECT OF THE INVENTION

In order to overcome these and other limitations of the prior art, it is an object of the present invention to provide a method and system for automatic management of electronic file lifecycles.

SUMMARY OF THE INVENTION

The embodiment of this invention enables organizations to salvage their existing investments in current storage technologies while allowing the adoption and incorporation of up and coming technology in one comprehensive system. Existing systems that are currently in production may be utilized to maintain some data while the newer more efficient storage systems may maintain the most current data. The invention supports incorporation of the widest variety of storage technologies and systems into a cohesive and homogeneous storage system that can expand and incorporate newer storage technologies as they become available and continue to meet the ever expanding demand for storage.

Typically, the file lifecycle allows the file to be accessed throughout its existence, regardless of where it is located within the network. A file may exist on any of the storage components or servers that comprise a virtual storage space. All relevant information regarding file management policies is maintained and enforced according to the invention for the entire file lifecycle. Several instances of a file may exist within a virtual space allowing the overall system to perform such tasks as load balancing, high availability, replication, backup and mirroring. This implies that for the entire lifespan of the file it will remain accessible.

According to the present invention there is provided a method of managing a file lifecycle comprising the steps of:
storing the file on a storage medium having associated therewith a set of policies relating to file storage locations;
determining from the associated policies when the file is to be moved;
moving the file to another storage location within a same or different storage medium when the file is to be moved.

According to another embodiment of the invention there is provided a method of managing a file lifecycle comprising the steps of:
providing a virtual storage medium having a plurality of storage media associated therewith and having associated therewith a set of policies relating to file storage locations within the storage media;
storing the file on a storage medium within the virtual storage medium;
at intervals, determining from the associated policies actions dictated by the policies for performance on the files;
performing the dictated actions on the file.

According to another embodiment of the invention there is provided a method of managing a file lifecycle comprising the steps of:
providing a virtual cabinet having a plurality of virtual drawers, each virtual drawer associated with at least a storage medium and a single drawer associated with storage media of a similar nature;
providing a plurality of policies, a policy associated with each virtual drawer; storing the file in a virtual drawer by storing the file on at least a storage medium associated with the virtual drawer;
at intervals, determining from the policy associated with the virtual drawer an action dictated by the policy; and,
performing the dictated action on the file.

The process of relocating a file could be triggered externally by an administrator, or be triggered by usage policies such as high & low watermarks or by a predefined event or interval.

According to yet another embodiment of the invention there is provided a method of managing a file lifecycle comprising the steps of:
providing a virtual cabinet having a plurality of virtual drawers, each virtual drawer associated with at least a storage medium and a single drawer associated with storage media of a similar nature;

providing a plurality of policies, general policies on a virtual cabinet basis as well as policies associated with each virtual drawer;

storing the file in a virtual drawer by storing the file on at least a storage medium associated with the virtual drawer;

upon receiving an access request to access the file, determining from the policy associated with the virtual drawer an action dictated by the policy; performing the dictated action on the file.

Advantageously, maintaining an index of the relevant information to access the files regardless of the location allows a single file to have several extents potentially spanning across several of the storage components within a virtual drawer or across several virtual drawers within a virtual cabinet. The entire file remains accessible and appears to the user completely intact as one whole file even though it might be spliced across different partitions on different servers, but this need not be so.

BRIEF DESCRIPTION OF THE DRAWINGS

The invention will now be described in conjunction with the drawings in which:

FIG. 3b is a simplified block diagram of physical storage devices relating to the virtual volume of FIG. 3a;

DETAILED DESCRIPTION OF THE INVENTION

Figure 1:
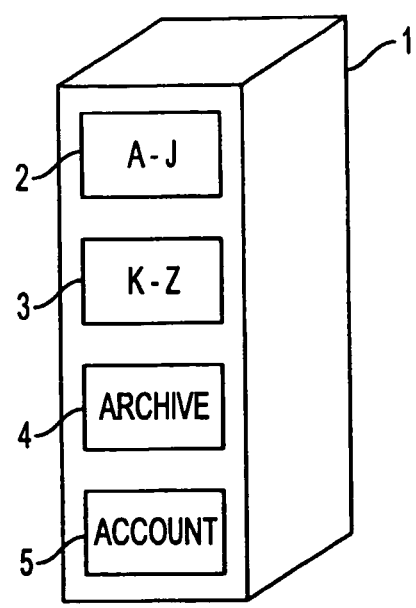
FIG. 1 is a simplified diagram of a filing cabinet.

Referring to FIG. 1, a simplified diagram of a file cabinet 1 is shown. The drawers 2, 3, 4, and 5 each hold a finite number of files. The drawers are of equal size and typically, each drawer is labeled, as shown, to indicate its contents. The file cabinet 1 contains files organized into A-J (drawer 2), K-Z (drawer 3), archives (drawer 4) and accounting (drawer 5). Such organization methods and filing systems are well known and their use in offices is widespread.

As noted above, the concept of file folders has been adopted for use in graphical user interfaces. The file folder is a graphical representation of a directory. A file folder may contain documents or further file folders and so forth. This is seen in the Macintosh® operating system and in Windows® operating systems. The use of these file folders is merely a convenient visualization tool for users. In actual practice, a single file folder is rarely comprised of many nested file folders and so forth.

Figure 2:
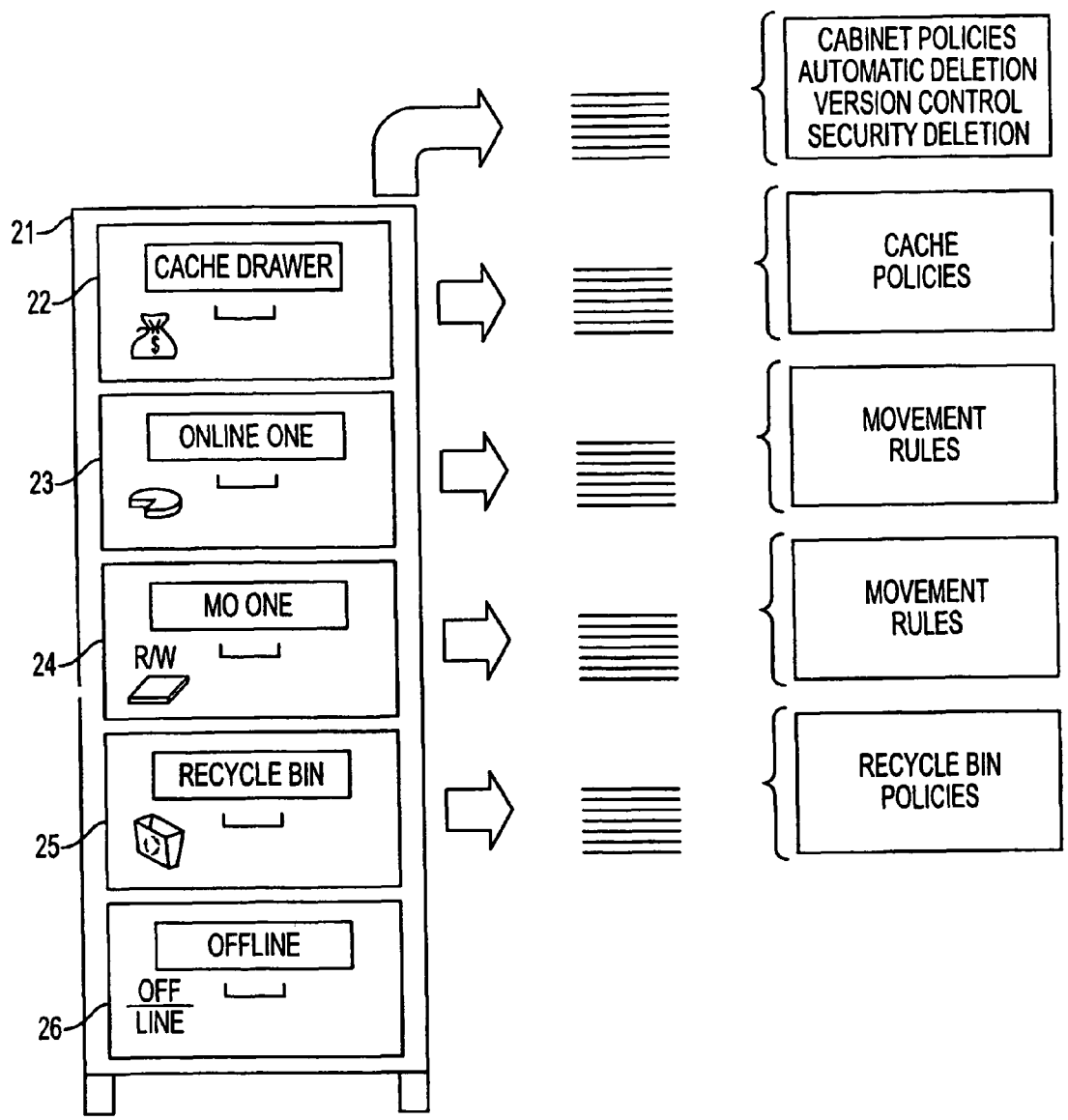
FIG. 2 is a simplified diagram of a virtual filing cabinet.

Referring to FIG. 2, a simplified diagram of a virtual file cabinet 21 used as an aid for visualizing a computer file system is shown. The virtual cabinet 21 has a number of drawers, each labeled to reflect their contents. The drawers are indefinite in size and may span more than a single physical storage medium. Some drawers may reflect storage media types as opposed to permanent storage. For example, the drawer 22 is a cache. The cache is shown labeled "cache drawer" but may in fact be labeled disk surface or to be filed or so forth. The drawer 23 is a storage medium that is currently available. Because the system uses virtual volumes, it is possible that a storage medium is offline. Of course, even when virtual volumes are not used, a network drive may be offline at a particular time. Drawer 24 relates to a magneto-optical drive for storing large volumes of data on removable media. Drawer 25 relates to a recycle bin or trash where deleted files are stored prior to being permanently erased. Finally, an offline media drawer 26 is a placeholder that retains information about for all components of the specific virtual cabinet that are currently unavailable and may be inaccessible. An Offline Media Drawer contains information related to all removable media that is not currently accessible. Of course, any drawer can be in an unavailable state due to a network or hardware related problem. Each Drawer has its own independent operational status that reflects its current state; these states include on-line/off-line, locked/unlocked as well as replicating, mirror synchronization, and backup in progress. A virtual cabinet or an individual drawer can be online or offline indicating that it is accessible or not. Additionally, they may be locked or unlocked indicating that for some administrative purpose the drawer is not accessible to a particular user/group or to the entire enterprise.

Associated with the virtual cabinet 21 is a set of cabinet policies relating to version control of files, security access, deletion, file archiving, and so forth. Further, associated with each drawer is a set of policies relating to that drawer. Some examples of policies for each drawer are set out herein below.

Figure 3A:
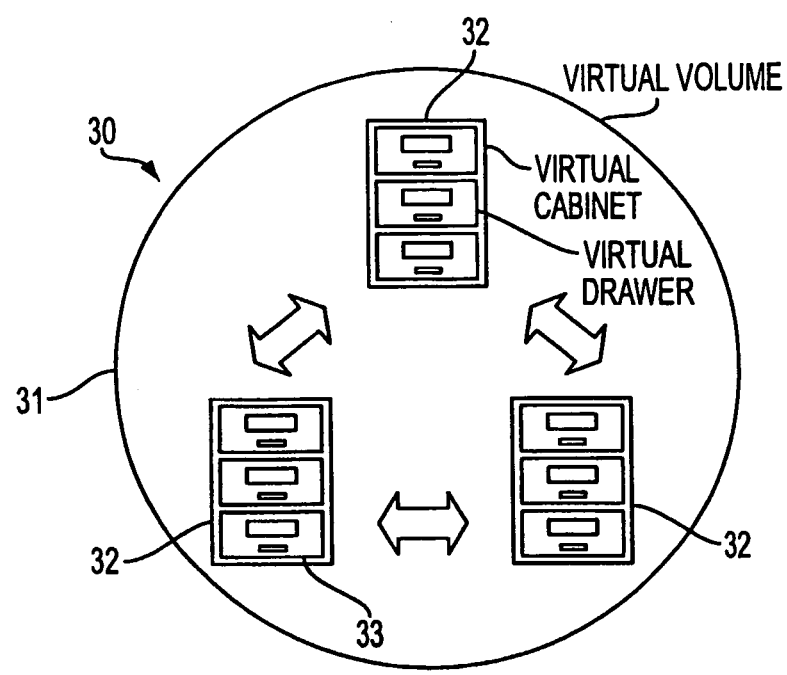
FIG. 3a is a simplified diagram of a visualization of a virtual volume comprising three virtual filing cabinets.

Referring to FIG. 3a, a simplified block diagram of a system 30 having a virtual volume 31 in the form of a virtual storage space, and virtual filing cabinets 32 defined therein is shown. A lifecycle of a file stored within a virtual drawer is controlled in a fashion that makes use of policies of that drawer, of the virtual cabinet in which the drawer is located and of the virtual volume. In combination, these policies define a set of policies for governing files in the specified virtual drawer 33. Typically, the files within a single virtual cabinet 32 are inside a single virtual subdirectory, but this need not be so. Additionally, the files within a single virtual drawer 33 may be inside an associated single virtual subdirectory, but this need not be so.

Individual data files are stored within virtual drawers 33. These drawers 33 expand and shrink dynamically and are typically constituted by a homogeneous media type. Besides storage, virtual drawers 33 are also defined for other purposes such as caching, redundancy control (such as backup, mirror & replica), file recycling and offline media management, as well as recycling. For example, the caching drawer 21 would reflect a storage medium providing high performance such as RAM.

Figure 3B:
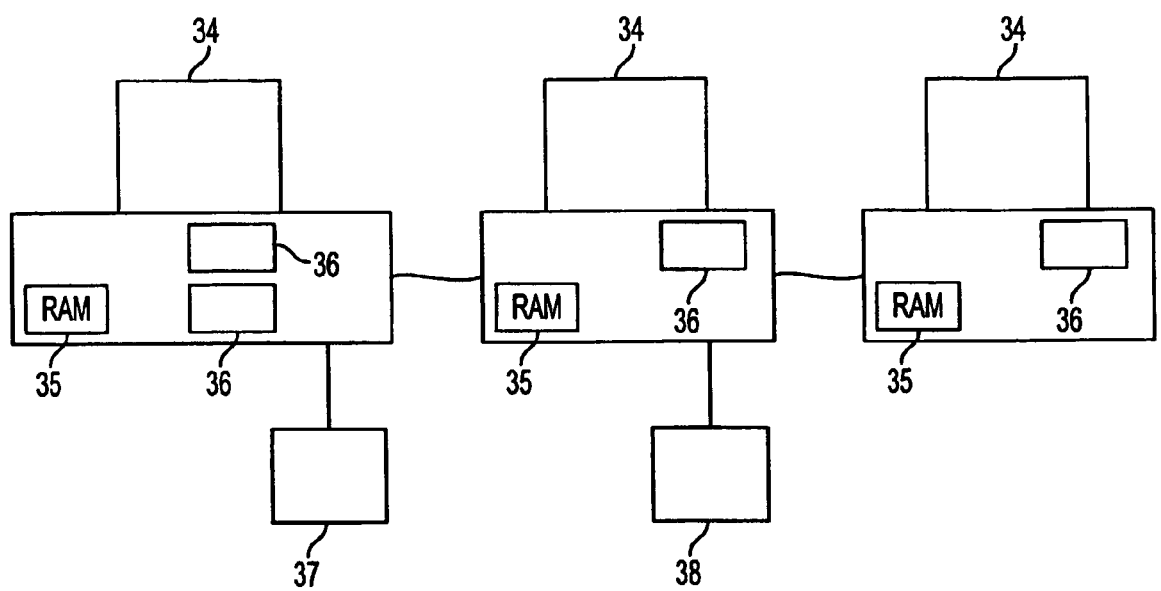

Referring to FIG. 3b a physical system is shown comprising different storage media for storing different data within different drawers. A network is shown comprising a plurality of computer systems 34. Each system includes RAM 35, non-volatile storage devices and so forth. The non-volatile storage devices include hard drives 36, magneto optical drives 37, CD ROM writers 38, DVD with its different flavours of DVD-RAM, DVD-ROM, DVD-R, DVD-RW, DVD+RW, etc. as well as flash disks, tape and other forms of storage. Each physical device is associated with one or more cabinets and with one or more drawers.

Figure 4:
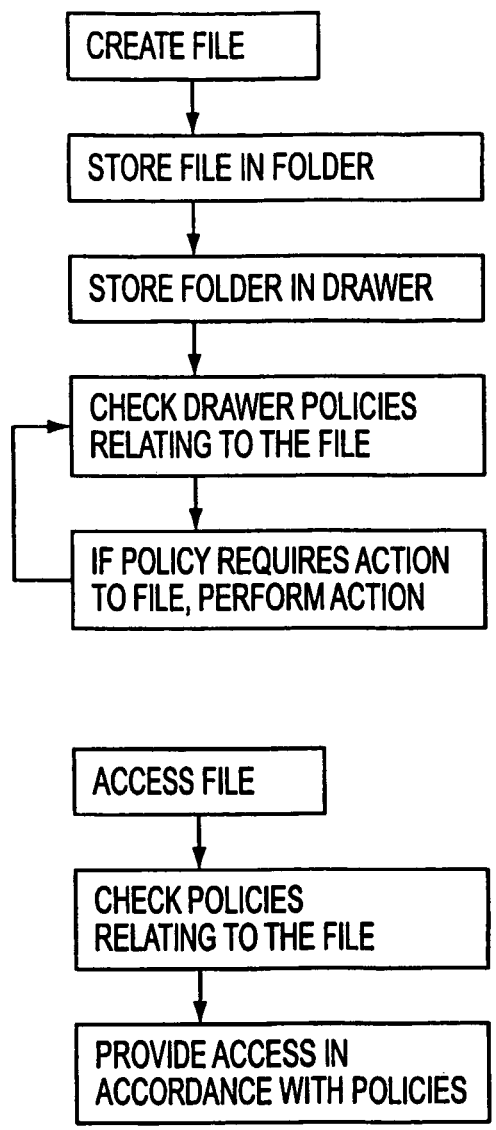
FIG. 4 is a simplified flow diagram of a method of file lifecycle management.

Referring to FIG. 4 a simplified flow diagram of a method of file lifecycle management is presented. The goal of file lifecycle management is generally to control a file from its inception, throughout all stages of its existence. If a lifecycle management system is complete, it safely ensures information availability and simultaneously provide a cost effective storage location for each file, according to predefined administration policies. The life cycle of the file could include policies that determine when it will expire and at the administrators discretion be automatically disposed of and deleted securely or moved to the recycle bin.

Each virtual cabinet contains general policies to be applied for the files under its control; in turn, each Virtual Drawer in a cabinet includes further rules for administering files in its domain. Further, it is possible that within a virtual storage space, there are high-level policies that apply to all files.

A file is created and placed within a file folder. The file folder is similar to those known in the art and, typically, relate directly to directories. The drawer typically relates to a higher-level directory. The drawer has policies, which include policies of the cabinet and may further include system level policies such as those of the virtual volume and so forth. These policies are used to evaluate a lifecycle stage of a file within the drawer and to determine a subsequent drawer where the file folder will be stored within the virtual cabinet. Upon storage of the file within a folder within the drawer, the policies are monitored, as is the file to determine when each or any policy is applicable. When a policy is applicable, it is applied to the file or to the drawer as required. The use of storage cabinet or drawer is completely transparent to the user. As far as the user is concerned the file is stored in a particular directory on a particular drive. Internally to the system the file may redirected to an entirely different location and may even be split across different devices across the network. The internal directory structures as well all the policy enforcement and file management is handled and maintained according to the inventive method (metadata).

Similarly, in the other portion of the flow diagram of FIG. 4, a file is accessed. Upon the file being accessed, the policies are checked to determine any that relate to files being accessed that are within the drawer. Those applicable policies are implemented and the policies of the drawer are maintained. Of course, numerous other actions may trigger policies. Typical examples of these include deleting files, moving files, copying files, and so forth. Each of these actions may be considered a file access operation.

In essence, implementation of policies allows for automated file lifecycle management. For example, a virtual cabinet is constituted by virtual drawers and sets of rules. The rules relate to aspects of file lifecycle management. Some examples of policy areas and implementations are set out below.

File retention policies are one of the most important aspects of file lifecycle management. These policies determine how files are removed from a system. For example, in Windows 98® a file, when deleted from a hard disk drive is placed in a recycle bin from which it is only removed when the recycle bin is emptied. Though this provides convenient retrieval of accidentally deleted files, it is not akin to file lifecycle management.

For example, using policies, a cause and a respective action are set out. For file retention, these actions include file deletion, file deletion with security to prevent retrieval, file archiving, file locking to prevent deletion, moving a file to a different drawer and so forth. A typical file retention policy for the virtual cabinet of FIG. 2 is as follows:

Cache Drawer: If file is saved, transfer file to online one (drawer 23).
Online One: If file is not accessed for 30 days transfer to MO One (drawer 24).
If file is deleted, transfer to Recycle Bin (drawer 25).
MO One: If file is not accessed within 30 days,
Store the file on a removable WORM storage medium.
If file is accessed more than 5 times within 30 days,
Transfer file back to online one (drawer 23).
Recycle Bin: If file is not restored in 30 days,
Store file on a non-volatile storage medium and delete.

Here, a file is stored in the cache until it is saved or it may be saved to any other drawer according to a predefined policy. Once saved it is placed in the file drawer automatically. It remains there during use. Once the file is not accessed for a period of time, the file is transferred to an MO drawer where it is stored in a less conveniently accessible medium. It remains there during a period of intermittent use. Should the file be used often, it will be transferred back to one of the more accessible drawers such as the active file drawer 23. When no use of the file is made for a period of time, it is archived. Archiving of the file takes the form of transferring it to a removable medium. This operation may take place at intervals depending on the size of the removable media, the size of the organisation and the size of the virtual cabinet. As noted, even deleted files may be archived for later retrieval according to the invention. By maintaining an index of files and their locations, it becomes a simple matter to find a file whether deleted, archived, or active.

Though the above example is quite simple, far more complex file management policies are possible. For example, some files may be deleted without archiving. These would include highly secure files, which are subject to secure deletion, personal files that are not necessary for the company operations, and so forth. Also, some files that are replaced may be deleted in order to replace same instead of simply accessed and modified. Another added variable is time. Files may be "non-volatile" for a period of time after creation or during certain times of day. This would prevent an after-hours assault on a computer network from damaging files stored thereon.

Recycle bin retention is another policy-based issue. It may be desirable to maintain an index of all files deleted from a recycle bin, or this may be unnecessary. If necessary, the index is stored as part of the recycle bin and may itself be archived at intervals or when of sufficient size to free up space in the recycling bin drawer 25. Other variables affecting policies include size capacity and a number of files relating to each drawer.

Another policy that affects either a cabinet or its drawers is the quota on user space. Quotas are enforced on a user basis. This is based on a unique User or Group identifier. A maximum amount of storage space and a maximum quantity of files is controllable. This Quota may be enforced at different levels such as, on a drawer-by-drawer basis or on a cabinet wide basis or even on an entire virtual volume basis.

As such, the functions currently handled manually by each individual user of a system are handled automatically. Since archiving storage media are cheaper than active storage media, the system results in considerable cost savings. Further, since none must waste time in ensuring the policies of the virtual cabinet, in contrast to a file clerk who performs these functions for physical file cabinets, there is cost savings in the policy based organisation structure.

In the exemplary embodiment, a messaging system is implemented to route error and other messages to appropriate entities. An example of the problem is as follows: if a file is not accessed for 30 days and is being transferred to the archiving drawer 24 and an error occurs, who gets the error message?

Notification of breach of security attempts as well as operator requests are routed to the designated entities according to pre-defined policies. These policies are modified and managed by designated personnel. Notification policies are optionally defined for each of the actions taken by the system to enable auditing, trouble shooting, configuration management as well as system optimization. The notification process allows for numerous notification messages across different protocols with varying levels of severity to be declared for different errors and warnings. For example, the offline media management process optionally has one of a number of pre-defined policies;

If a specific user or user group requests access for a file that is located on a media that is currently offline then
  Pause the request indefinitely;
    Notify the user that the file is currently is offline or not,
    Allow the user to cancel the request,
    Notify the operator or administrator that there is an outstanding request for an offline media when applicable,
    Allow the administrator or operator to cancel the request,
    Notify the user that the request was cancelled when applicable,
    But this need not be so.
  Pause the request for a specified time period:
    Notify the user that the file is currently offline when this is so,
    Notify the user of the request time out period when applicable, Allow the user to cancel the request,
    Notify the operator or administrator that there is an outstanding request for an offline media,
    Allow the administrator or operator to cancel the request,
    Notify the user that the request was cancelled,
    If the request timed out then;
      Notify the operator or administrator that there is an outstanding request for an offline media that timed out,
      Notify the user that the request timed out,
    Of course other variations are also applicable and user notification is often optional as is the option to cancel a request.
  Fail the request immediately:
    Notify the user that the file is currently offline and inaccessible,
    Notify the operator or administrator that there was a cancelled request for a file located on an offline storage media,
    Notify the user that the request was cancelled, Therefore, these errors are trapped and are passed onto an administrator of the cabinet or of the virtual volume. Messages may also be routed to users/groups according to pre-defined policies. A hierarchy of notifications is typically implemented to determine whom to notify. An example of a hierarchy is operators, file owners, group administrators, drawer administrators, cabinet administrators, and volume administrators. Also, notification to other parties such as individual users is possible based on policies and a status of a requested file or file operation. Optionally, notification is sent to the user requesting the file(s) irrespective of the operating environment.

In the virtual cabinet of FIG. 2, there is shown an offline drawer 26. Offline media require management policies of their own. In particular, those virtual drawers that may be offline, need policies relating to that event. This is analogous to physical drawers that may be locked. When the drawer is locked, provision is made for files outside the drawer belonging therein and for files within the drawer that are needed.

Before setting a drawer offline, policies are reviewed to determine that the drawer is one supporting offline activity and that according to preset policies; the drawer can be taken online at present. Similarly, policies are verified before a drawer that is offline is returned to online operation. These policies may be significantly more complex than a lock and key scenario. A drawer may automatically go off line in some situations—security breaches, too much activity, reorganisation, etc. That same drawer may require certain events before returning online. In the case of security concerns, an indication from a trusted individual that security concerns are not real is commonly required. This may require a password or some other identification code. Even once restored, the restoration may not restore the drawer to full information accessibility as before. There may be time periods of partial availability or other policies to enhance security or to improve performance.

Preferably, information is logged relating to virtual cabinet operations for later use in trouble-shooting, tune-up and optimization purposes.

Another drawer (not shown) is a Mount-point drawer or cabinet reflecting data for retrieval from a communication medium in the form of the Internet. This drawer/cabinet may have, for example, known world wide web information addresses stored therein indicative of information location(s) for retrieval. Thus, accessing this drawer/cabinet provides a user with commonly available but updated information such as exchange rates, associated company data for contacting them, weather and traffic information and so forth. Instead of storing this data locally, it is stored on the World Wide Web but accessed as if it were in the local electronic file cabinet. Typically, this data is not managed using the lifecycle management method of the virtual cabinet/drawer since it is drawn from somewhere else, from a system belonging to someone else. That said, the inclusion of the data in a local virtual drawer/cabinet is beneficial in simplicity of access and up to date information content.

Another virtual cabinet may be a Read-Only cabinet that may contain data created outside the context of the virtual volume/cabinet/drawer. This data could be contained on distribution media such as CD-ROM/CD-R/DVD-R/DVD-ROM. Such a cabinet would be in a read-only state, even though it might contain a cache drawer as well as an offline media drawer and potentially a number of read-only drawers. This implies that data contained on such read-only media may be indexed, cross-referenced and cached by the virtual volume for quick access and incorporated into the virtual volume.

Though a virtual drawer is described as being entirely within a single virtual directory, this virtual directory could be a single physical directory. Alternatively, the files are inside a single physical subdirectory absent a virtual directory. Further alternatively, the files are inside a plurality of physical and virtual subdirectories.

In an alternative embodiment, the file cabinet is formed of physical volumes instead of virtual volumes wherein a cabinet is comprised of a plurality of drawers each associated with a physical storage device.

In an embodiment, many Virtual Cabinets may share a single Virtual Drawer. As such, using any of several virtual cabinets provides access to a same virtual drawer. This allows for system load balancing wherein virtual drawers are shared to allow a predetermined amount of load on each physical storage device within each virtual device. As such, portions of a physical storage device are associated with different drawers in order to balance the load such that access to the drawers is optimized for speed.

Because of the structure of the virtual cabinet, existing data stored on electronic media is easily incorporable within newly created virtual volumes and virtual cabinets.

Figure 5:
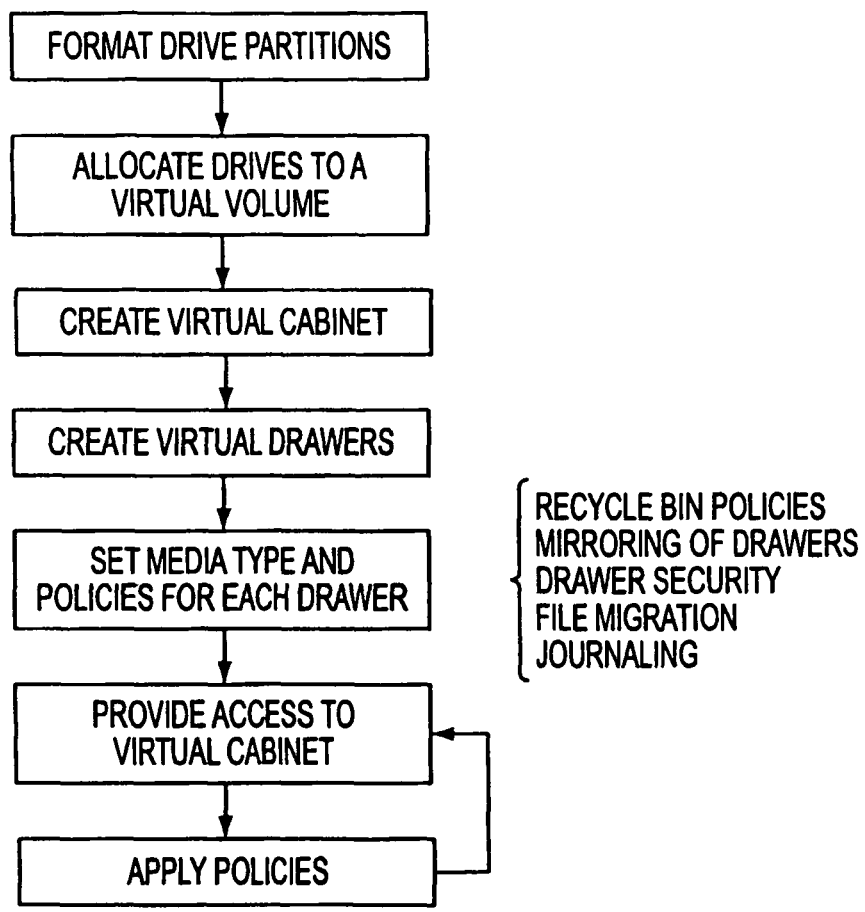
FIG. 5 is a simplified flow diagram of an implementation of the system for Windows NT®; and, FIG. 6 is a simplified flow diagram of a method of using retention dates to track file lifecycles.

Referring to FIG. 5, a simplified diagram of an implementation of the system is shown. Here all native file system features are supported, but this need not be so. The filing cabinet has tremendous expandability. When using 64 bit addressing the virtual volume is expandable to $2^{64}-1$ partitions and files. This is a very large number. Expansion of the volume or of the cabinets or drawers optionally takes place on the fly or on demand.

Partitions are formatted in the native file system format such as NTFS and are allocated from an appropriate Media Pool, but this need not be so.

Administrative processes allow for compacting of information on members. Empty media remain allocated to the virtual volume. Optionally, these members may be automatically or manually removed once emptied, depending on a pre-defined policy.

Further administrative options allow definition of different techniques to optimize removable media usage, balancing between performance and storage space utilization such as selecting options, i.e.: always write contiguously—split to utilize available space—split only when file size exceeds media size. Specialized caches for read, write or both operations are provided.

Each virtual volume supports pre-migration techniques for off-peak hours and pre-fetch techniques for improving scheduling.

The implementation supports several storage types including:
Fixed: Hard disk partitions—RAID, Flash disks. (SCSI, IDE Fibre Channel, etc.)
Removable: MO-WORM-DVD-RAM-DVD-ROM-DVD-R-DVD+RW-Tape A local or remote server provides these services. The complete range of native operating system security features are supported. Further security features relating to policies of the virtual cabinet are also supported. The native operating system security features and the policies are enforced at a file level and a directory level.

The invention supports mirroring merely by setting mirroring policies for particular drawers. This is typically achieved using two or more physical media for storing identical data. Of course, the use of an archiving medium and a cache allows for data to be mirrored in an archiving medium during use without slowing performance of the system. Similarly, should a portion of the storage medium fail, the mirrored data is retrieved from the archiving storage medium into the cache for rapid access. Mirroring is neither limited nor confined to different drawers of different media types, but rather is a policy that allows files to be mirrored to similar typed drawers as well or instead.

Further, the archiving storage device is then an accurate replica of the data that is useful as an archive or for data transfer. Further, the use of several archiving storage media is supported to form a plurality of replicas on different media. Optionally, replication is performed between drawers of a same type enabling the files to be accessed at all times with same identical performance.

Optionally, a journaling file system is implemented to make rebuilding of data for faster recovery in case of storage device failure. Preferably, concurrent access is provided during data rebuild. Alternatively stated, as data is being scanned, already parsed information is available to users, typically, in a read-only state. The basic concept of metadata regeneration is achieved by reconstructing the metadata from the individual components that make up the virtual drawers/cabinets and virtual volumes. The metadata is replicated, either partially or fully, through out the virtual volume on the individual components, allowing the metadata to be regenerated in its entirety from these components, but this need not be so. The metadata may be replicated or even mirrored on the local server or across the network to another set of storage components, perhaps an identical set to the original, that would provide plurality of access and enhance performance and provide a redundant fail over mechanism.

Figure 6:
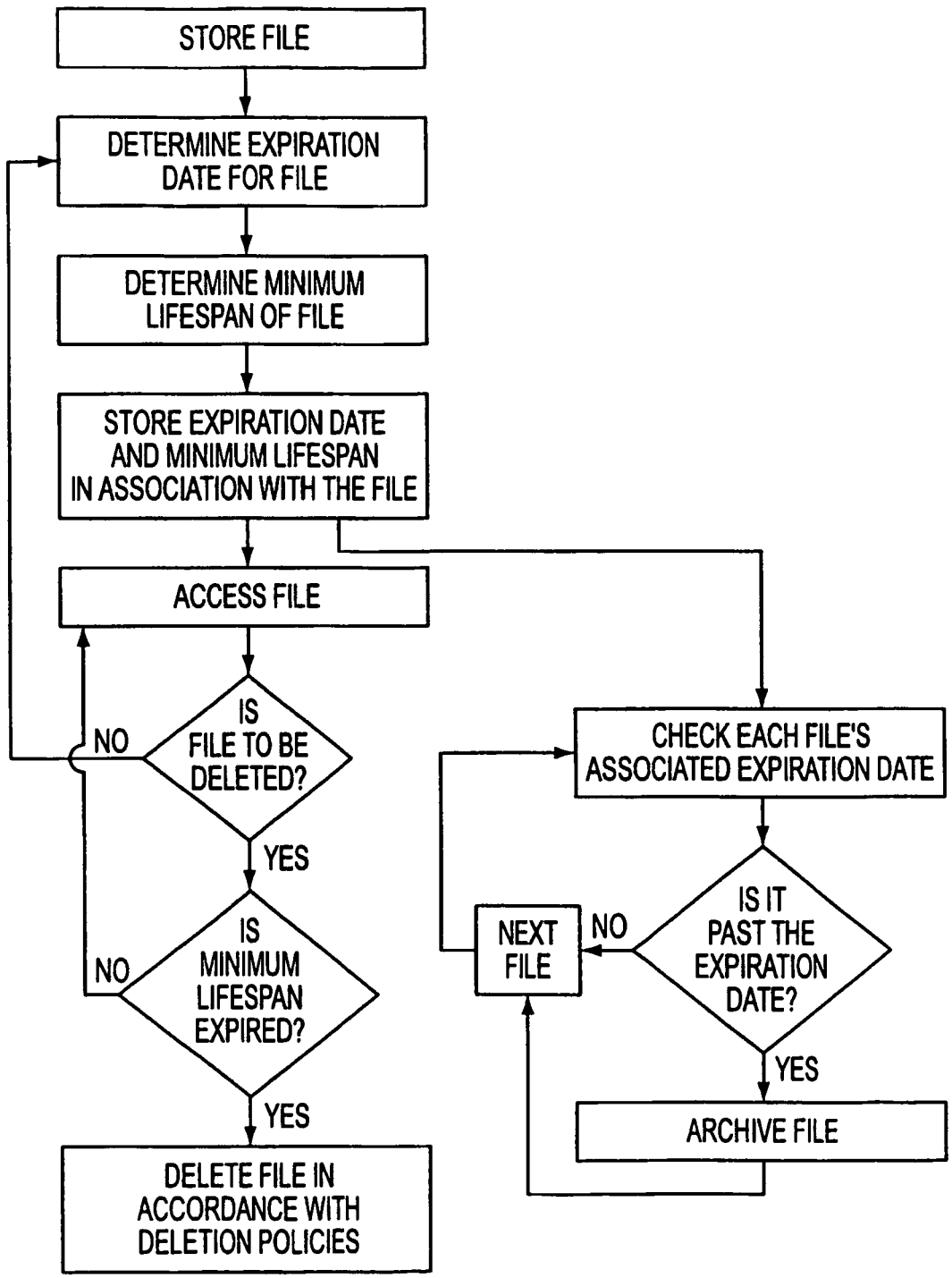

Referring to FIG. 6, a simplified flow diagram of a method of using retention dates to track file lifecycles is shown. File expiration dates are stored in association with each file. The expiration dates are indicative of a minimum time before deletion, if any; a date on which to delete the file; and any policies relating to the deletion such as archiving or moving the file to other storage media and so forth. Retention policies within a drawer effect the expiration dates. For example, every time a file is accessed, the retention date is updated The update may differ depending on the access type—read, write, copy, etc.—or may remain the same across all access functions. Also, the policies are capable of supporting distinctions based on user identifications, file types, security levels, and so forth. Another example would allow files that are no longer required for the organization to expire after they reached the legal statute of limitations to be disposed of automatically without delay.

The pseudo file system uses expiration dates on files to track the use of the file. The expiration dates aid the disposal of seldom-used files, selecting them to be backed up and/or deleted from the virtual drawer. A minimum and a maximum retention period are specified for the files in the volume.

To determine the expiration date of a newly created file the maximum retention time value is added to the current time, and every time the file is accessed or modified its expiration is updated with a minimum retention time value+current time if it is after the previously stored expiration date. On the other hand expiration policies could be defined to allow files to expire based on strictly the creation date, but this need not be so.

Similarly, a volatility period for a file is selectable during which a user is unable to delete the file. Optionally, the volatility period is stored with an indication preventing renaming of the file when set and allowing it when cleared.

Also, with each file are stored policies on file deletion within the scope of those policies supported by the virtual drawer. Policies for file deletion include the following: delete with security; delete without security; delete with archive; prevent deletion but allow renaming; prevent deletion prevent renaming; send to recycle bin; maintain version control data; and delete prior versions.

Version control is a significant aspect of file lifecycle management. When a file is modified, a new version is created. The newer version may be created by duplicating and modifying the previous file and maintained as a completely intact file or as a differential file relative to the previous version of the file. The previous version is typically discarded—replaced or deleted, This need not be so. Policies on file retention can maintain previous versions and if so desired, will maintain a list of previous versions including when last modified and by whom. These old versions are typically stored throughout the virtual cabinet and exist in any drawer, according to the governing policies that are set by an administrator. Users may have access to only the most recent version of a file, but this also need not be the case. Policies may limit a number of generated versions or an interval between new versions in order to limit storage requirements.

Typically, when version control is enabled, only a last file version is available other than by special request. When a file is opened for writing, a modification flag is maintained to ensure that new information has been written to the file. This reduces the amount of versions saved by eliminating those reflecting no changes. If the flag is set, a new version of the file is created—a copy—and the data is stored in this new file. Typically, a version identifier is maintained as a sequential number included in the file ID and is incremented every time a new version is created. Of course, other forms of version numbering such as date and time and so forth are also possible. Preferably, in the file properties list, the history of modifications to a file stored through version control appears. Depending on the governing policies set by the administrator and the underlying operating system, the different versions of the file may be visible to the user but this need not be so.

Another version control policy is Selective/discretionary version control. Selective version control is a suitable file retention policy to thin versions of a file based on age such that, for example, one version per week is stored for versions over one month old and one version a day is stored for versions over a week old and one version an hour is stored for versions less than one week and over one day, and finally all versions are stored for the last day. By selectively reducing the number of versions maintained, storage requirements do not balloon while, for most applications, reasonable version control is maintained.

Of course, once the file is moved to the archiving drawer 24, the older versions are archived since they are unlikely to be accessed. Similarly, if the file is moved to the recycle bin, the older versions may be archived, deleted, or moved to the recycle bin with the file.

The invention embodies a complete suite of access rights that any administrator may define which will be enforced by the system. They allow the administrator to specify who can perform a specific administrative task if any, and who will get notified in the case of a particular event or for all events and how. The enforcement of access rights may be completely or partially disabled at the administrator's discretion, or who ever is designated with the privilege to do so. Every aspect of the system is configurable.

Numerous other embodiments may be envisaged without departing from the spirit or scope of the invention.

APPENDIX A

Virtual Volume:
  Name Volume Label (Same as Name)
  Metadata Information (partition list)
  Data Members (partition list)
  Space available—Maximum number of files
  Scan Parameters (schedule info)
Virtual Cabinet:
  Name=Subdirectory name (always linked to the directory ID)
  Path Selector (where the VC is located)
  File Retention Policies
  Automatic Deletion
  Prevent Deletion (Access Control Rules)
  Recycle Bin
  Version Control
  Movement Rules between Virtual Drawers
  Move from Source-DR to Destination-DR files in <criteria>.
  <criteria>:
  Any File
  Include only files that match (Age, Size, Attributes, File-Mask, User/Owner/Creator) [alo]
  All files, excluding files that match (Age, Size, Attributes, File-Mask) [alo]
  Age:
  n days since (CRT, LMT, LAT)
  Attributes:
    Read-Only/Archive/Hidden/System/Compressed (disabled) Size:
    Files smaller than n [size unit]
    Files larger than n [size unit]
  File-Mask:
    Name pattern/extension pattern
  User/Owner/Creator
    Files created by a particular user or Group
    Files whose ownership is currently held by a specific user or user group
  File will always be created in one of the virtual cabinet's drawers according to a pre-defined policy.
Virtual Drawer:
  Name
  Server:
  Local/Remote
  Class:
  Class: Cache-Storage-Mountpoint
  Function:
  Primary Storage-Recycle-Replica-Backup-Mirror-Archive-Offline
Media
Type:
  Fixed/Removable (Online-Nearline)
  Media:
  Magneto Optical/WORM/DVD-RAM/DVD-ROM/DVD-R/DVD+RW/TAPE/CD-ROM/CD-R/FLASH/RAM
  Replication/Mirroring
  Drawer Access Mode (Read/Write (RW), Read-Only (RO), Archive Mode [AM])
  Primary Media Pool
  Rules for taking Offline (weighting factors, automatically, etc.)—Storage location
  Rules for Restoration (messaging thru Notification Mgr)
  Status:
  Online-Offline-Locked-Unlocked-Mirror-Synchronization-Replication-In-progress-Backup-in-progress-Accessible-Inaccessible
  Shared:
  Private-Public

TABLE 1

| VIRTUAL VOLUMES: PROPERTIES - ATTRIBUTES - POLICIES | | | |
|---|---|---|---|
| Virtual Volumes | Virtual Drawers | Virtual Cabinets | Virtual Drawers in a Virtual Cabinet |
| Name = Volume Label | Name | Name = Subdirectory | Movement Rules |
|  | Control: Native - Foreign | Path Selector(s) | Recycle Bin Policies |
| Scan Parameters | Location: Local - Remote |  | Cache Policies |

TABLE 1-continued

VIRTUAL VOLUMES: PROPERTIES - ATTRIBUTES - POLICIES

| Virtual Volumes | Virtual Drawers | Virtual Cabinets | Virtual Drawers in a Virtual Cabinet |
|---|---|---|---|
| User/Group Quotas | Class: Cache - Storage Mountpoint | Automatic Deletion Policies | Scan Policies |
| | Type: Fixed - Removable | Version Control Policies | User/Group Quotas |
| | Media: HD - FLASH - MO - WORM - CD-R - CD-ROM - DVD-RAM - DVD-R - DVD+RW - RAM - TAPE | Access Mode: Read/Write - Read-Only - Archive Mode | |
| | Access Mode: Read/Write - Read-Only - Archive Mode | Security Deletion Policies | |
| Status: Online - Offline - Locked - Unlocked - Mirror-synchronization - Replication-In-progress - Backup-In-progress - Accessible - Inaccessible | Status: Online - Offline - Locked - Unlocked - Mirror-synchronization - Replication-In-progress - Backup-In-progress - Accessible - Inaccessible | Status: Online - Offline - Locked - Unlocked - Mirror-synchronization - Replication-In-progress - Backup-In-progress - Accessible - Inaccessible | |
| | Primary Media Pool Shared or Not shared | Type: Virtual Directory - Mount-point/Symbolic-link | |
| | Default Storage Location | | |
| | Function: Primary Storage - Recycle - Replica - Backup - Mirror - Archive - Offline Media | | |
| | Share: Public - Private | User/Group Quotas | |
| | Taking Offline Policies | | |
| | Restoration Policies | | |
| | High/Low Watermarks | | |
| | Drawer Direct Access (Read/Write) | | |

What is claimed is:

1. A computer-implemented method of managing a file lifecycle, the method comprising:

providing, by at least one computer processor, a virtual cabinet comprising at least one of: a file folder, a path, or a container holding at least one of: at least one file, or at least one directory, said virtual cabinet having an associated at least one virtual drawer, wherein said at least one virtual drawer comprises at least one of: at least one storage device, at least one portion of at least one storage device, at least one storage pool, or at least one storage volume;

receiving, by the at least one computer processor, at least one set of at least one file lifecycle policy;

associating, by the at least one computer processor, said at least one set of said at least one file lifecycle policy with said at least one virtual cabinet;

associating, by the at least one computer processor, at least one of: at least one file of at least one file system of an operating system, or at least one directory, with said at least one virtual cabinet, wherein said at least one file or said at least one directory associated with said at least one virtual cabinet, at least one of:

is associated with said at least one set of said at least one file lifecycle policy, receives said at least one set of said at least one file lifecycle policy, or inherits said at least one set of said at least one file lifecycle policy of said at least one virtual cabinet;

automatically determining, by the at least one computer processor, from said at least one file lifecycle policy associated with said at least one virtual cabinet at least one action dictated to be performed on said at least one file or said at least one directory, by said at least one file lifecycle policy;

automatically performing, by the at least one computer processor, said at least one action dictated by said at least one lifecycle policy on said at least one file or said at least one directory;

wherein, while said at least one file or said at least one directory continue to exist:

providing transparent access to said at least one file or said at least one directory regardless of where said at least one file or said at least one directory is at least one of:

created, located, or moved to, independently of an application, or a user; and wherein said automatically performing said at least one dictated action, is performed upon occurrence of at least one triggering event, wherein said at least one triggering event comprises at least one of:

receiving a request for performing at least one file operation,
   wherein said tile operation comprises at least one of:
     modifying said at least one file or said at least one directory;
     creating said at least one file or said at least one directory;
     deleting said at least one file or said at least one directory;
     reading said at least one file or said at least one directory;
     writing to said at least one file or said at least one directory; or
     accessing said at least one file or said at least one directory; or determining an eligibility based on said set of at least one file life cycle policy to act or not act upon said at least one file or said at least one directory,
   wherein said eligibility to act comprises at least one of:
     eligibility to modify said at least one file or said at least one directory;
     eligibility to create said at least one file or said at least one directory;
     eligibility to delete said at least one file or said at least one directory;
     eligibility to read said at least one file or said at least one directory;
     eligibility to write to said at least one file or said at least one directory; or
     eligibility to access said at least one file or said at least one directory.

2. The method of managing a file lifecycle according to claim 1 wherein the automatically performing said at least one dictated action comprises at least one of:

automatically deleting said at least one file or said at least one directory when said set of at least one file lifecycle policy dictates deleting;

automatically storing said at least one file or said at least one directory according to said set of at least one file lifecycle policy;

automatically moving said at least one file or said at least one directory when said set of at least one file lifecycle policy dictates moving;

automatically creating said at least one file or said at least one directory when said set of at least one file lifecycle policy dictates creating;

automatically classifying said at least one file or said at least one directory when said set of at least one file lifecycle policy dictates classifying;

automatically retaining said at least one file or said at least one directory when said set of at least one file lifecycle policy dictates retaining;

automatically referencing said at least one file or said at least one directory when said set of at least one file lifecycle policy dictates referencing;

automatically protecting said at least one file or said at least one directory when said set of at least one file lifecycle policy dictates protecting;

automatically securing said at least one file or said at least one directory when said set of at least one file lifecycle policy dictates securing;

automatically replicating said at least one file or said at least one directory when said set of at least one file lifecycle policy dictates replicating;

automatically backing up said at least one file or said at least one directory when said set of at least one file lifecycle policy dictates backing up;

automatically mirroring said at least one file or said at least one directory when said set of at least one file lifecycle policy dictates mirroring;

automatically load balancing said at least one file or said at least one directory when said set of at least one file lifecycle policy dictates load balancing;

automatically preserving said at least one file or said at least one directory when said set of at least one file lifecycle policy dictates preserving;

automatically erasing said at least one file or said at least one directory when said set of at least one file lifecycle policy dictates erasing;

automatically disposing of said at least one file or said at least one directory when said set of at least one file lifecycle policy dictates disposing;

modifying said at least one file operation according to said set of at least one file lifecycle policy;

managing said at least one file or directory according to said set of at least one file lifecycle policy;

disabling or preventing operation of said file operation based upon said at least one file lifecycle policy;

storing said at least one file or said at least one directory according to said set of at least one file lifecycle policy;

moving said at least one file or said at least one directory according to said at least one file lifecycle policy associated with said at least one virtual cabinet;

automatically determining from said at least one file lifecycle policy associated with said at least one virtual cabinet, when said at least one file is to be acted upon; or automatically acting upon said at least one file or said at least one directory according to said at least one file lifecycle policy associated with said at least one virtual cabinet, whenever the at least one file lifecycle policy determines that said at least one file is to be acted upon.

3. The method of managing a file lifecycle according to claim 2 wherein the at least one file lifecycle policy relates to the at least one storage medium and to at least one date stored in association with each of said at least one file or said at least one directory.

4. The method of managing a file lifecycle according to claim 3 comprising storing in association with each of said at least one file at least one expiration indicator indicative of when the at least one file or said at least one directory is to be acted upon.

5. The method of managing a file lifecycle according to claim 4 wherein the at least one expiration indicator comprises at least one date on which to act upon the at least one file or said at least one directory in accordance with the at least one action dictated by the at least one file lifecycle policy from the at least one virtual cabinet.

6. The method of managing a file lifecycle according to claim 4 wherein the at least one expiration indicator comprises a minimum time before which the at least one file or the at least one directory is to be maintained in a current one of said at least one virtual drawer.

7. The method of managing a file lifecycle according to claim 2 wherein the at least one action comprises transferring based on at least one file lifecycle policy associated with the virtual cabinet the at least one file or the at least one directory from a first location to a second location.

8. The method of managing a file lifecycle according to claim 7 wherein said transferring the at least one file or the at least one directory comprises archiving the at least one file or the at least one directory based on at least one file lifecycle policy associated with the virtual cabinet.

9. The method of managing a file lifecycle according to claim 2 wherein said acting upon comprises deleting the at least one file or the at least one directory comprises determining based on at least one file lifecycle policy associated with the virtual cabinet and based on data stored in association with the at least one file or the at least one directory, at least one mode of deletion, and deleting the at least one file or the at least one directory in accordance with the at least one determined mode.

10. The method of managing a file lifecycle according to claim 9 wherein the at least one mode of deletion comprises at least one of a secure deletion, or an insecure deletion.

11. The method of managing a file lifecycle according to claim 1 wherein said at least one file or said at least one directory acted upon according to at least one file lifecycle policy in the virtual cabinet are stored within a virtual storage medium, and wherein said at least one file is stored according to at least one file lifecycle policy of a given one of said at least one virtual cabinet, and the at least one file or the at least one directory is stored on at least one similar storage media, according to the at least one file lifecycle policy of the given one of said at least one virtual cabinet.

12. The method of managing a file lifecycle according to claim 11 wherein at least one virtual drawer forms part of, or is associated with, at least one of a plurality of virtual cabinets.

13. The method of managing a file lifecycle according to claim 1 wherein said determining an action comprises:
   determining from the at least one file lifecycle policy at least one condition;
   evaluating each at least one file or at least one directory to determine a presence of the at least one condition; and,
   when the at least one condition is met, performing at least one action associated with the at least one condition as the determined action.

14. The computer-implemented method according to claim 1,
   further comprising:
   receiving, by the at least one computer processor, a request for the at least one file of the file system to be associated with at least one said virtual cabinet of at least one virtual volume;
   evaluating, by the at least one computer processor, at least one criterion based on at least one file lifecycle policy of the at least one virtual cabinet to determine at least one action dictated to be performed on the at least one file, wherein said dictated action comprises at least one of:
   moving the at least one file or the at least one directory,
   storing the at least one file or the at least one directory,
   changing location of the at least one file or the at least one directory,
   classifying the at least one file or the at least one directory,
   creating the at least one file or the at least one directory,
   accessing the at least one file or the at least one directory,
   retaining the at least one file or the at least one directory,
   referencing the at least one file or the at least one directory,
   non-using the at least one file or the at least one directory,
   storing the at least one file or the at least one directory,
   protecting the at least one file or the at least one directory,
   replicating the at least one file or the at least one directory,
   backing up the at least one file or the at least one directory,
   mirroring the at least one file or the at least one directory,
   load balancing the file or the at least one directory,
   preserving the at least one file or the at least one directory,
   doing nothing with the at least one file or the at least one directory,
   expiring the at least one file or the at least one directory,
   erasing the at least one file or the at least one directory,
   disposing of the at least one file or the at least one directory,
   destroying the at least one file or the at least one directory,
   deleting the at least one file or the at least one directory,
   executing the at least one file or the at least one directory,
   changing the at least one file or the at least one directory,
   modifying the at least one file or the at least one directory,
   changing the attributes of the at least one file or the at least one directory,
   disabling operation on the at least one file or the at least one directory,
   preventing operation on the at least one file or the at least one directory, or
   archiving the at least one file or the at least one directory;
   automatically acting upon, by the at least one computer processor, the at least one file or the at least one directory in the determined dictated action, and
   providing, by the at least one computer processor, the transparent access to the at least one file or the at least one directory regardless of where the at least one file or the at least one directory is at least one of: created, located, or moved to, independently of an application, or a user.

15. The method of managing a file lifecycle according to claim 14 wherein the at least one virtual cabinet file lifecycle policies relate to file types of the at least one file or the at least one directory to be acted upon.

16. The method of managing a file lifecycle according to claim 15 wherein at least one virtual cabinet comprises at least one virtual drawer and wherein at least one virtual drawer forms part of more than one virtual cabinet.

17. The method of managing a file lifecycle according to claim 16,
   wherein the at least one virtual cabinet forms at least one context within a context based file lifecycle management system, and
   wherein at least one file or the at least one directory created within at least one context of the at least one virtual cabinet is made subject to the at least one file lifecycle policies of said at least one virtual cabinet.

18. The method of managing a file lifecycle according to claim 14 wherein said acting upon the at least one file or the at least one directory comprises acting upon the at least one file, wherein the at least one file is associated with the at least one virtual cabinet.

19. The method of managing a file lifecycle according to claim 18 wherein the at least one file or the at least one directory is governed by the at least one file lifecycle policy of the at least one associated virtual cabinet and wherein at least one of said at least one action dictated by the at least one file lifecycle policy is performed on the at least one file or the at least one directory throughout the lifecycle of the at least one file or the at least one directory.

20. The method according to claim 1, wherein said at least one file lifecycle policies relate to aspects of file classification and file disposition comprising at least one of:
file creation,
file retention,
file reference,
file non-use,
file security,
file protection,
file preservation,
file storage locations within a storage medium,
cost effective storage of a file, or
file expiration.

21. The computer-implemented method of claim 1, wherein said determining said eligibility comprises determining based on at least one of:
inactivity,
a retention policy,
a disablement or prevention of operation of an action,
a modification,
an immediate action,
an action in the future,
a file operation, or
a result of a file access operation.

22. A computer-implemented method of managing a file lifecycle comprising:
providing, by at least one computer processor, at least one virtual cabinet, wherein each of said at least one virtual cabinet comprises at least one of: at least one folder, at least one container, or at least one path, and wherein said virtual cabinet has associated with said virtual cabinet at least one virtual drawer, wherein said virtual drawer comprises at least one of:
at least one storage device;
at least one portion of at least one storage device;
at least one storage group,
at least one storage pool, or
at least one storage volume;
associating, by the at least one computer processor, at least one life cycle policy, with said at least one virtual cabinet;
associating, by the at least one computer processor, with said at least one virtual cabinet at least one of:
at least one file of at least one file system of an operating system, or
at least one directory;
determining, by the at least one computer processor, from the at least one file lifecycle policy associated with said at least one virtual cabinet, at least one action dictated by the at least one file lifecycle policy;
automatically performing, by the at least one computer processor, the at least one action dictated by the at least one file lifecycle policy on the at least one file or the at least one directory,
upon occurrence of at least one triggering event, wherein said at least one triggering event comprises upon at least one of:
receiving at least one file operation,
wherein said tile operation comprises at least one of:
modifying said at least one file or said at least one directory;
a file or directory modification request:
creating said at least one file or said at least one directory;
a file or directory creation request;
deleting said at least one file or said at least one directory;
a file or directory deletion request;
reading said at least one file or said at least one directory;
a file or directory read request;
writing to said at least one file or said at least one directory;
a file or directory write request;
a file or directory access request; or
accessing said at least one file or said at least one directory;
receiving a request for performing at least one file operation,
wherein said file operation comprises at least one of:
modifying said at least one file or said at least one directory;
a file or directory modification request;
creating said at least one file or said at least one directory;
a file or directory creation request:
deleting said at least one file or said at least one directory;
a file or directory deletion request;
reading said at least one file or said at least one directory;
a file or directory read request;
writing to said at least one file or said at least one directory;
a file or directory write request;
a file or directory access request; or
accessing said at least one file or said at least one directory;
receiving a request for performing at least one file operation configured to act upon said at least one file or said at least one directory,
wherein said file operation comprises at least one of:
modifying said at least one file or said at least one directory;
a file or directory modification request;
creating said at least one file or said at least one directory;
a file or directory creation request;
deleting said at least one file or said at least one directory;
a file or directory deletion request;
reading said at least one file or said at least one directory;
a file or directory read request;
writing to said at least one file or said at least one directory;
a file or directory write request;
a file or directory access request; or
accessing said at least one file or said at least one directory; or
determining an eligibility based on said set of at least one file life cycle policy to act or not act upon said at least one file or said at least one directory,
wherein said determining said eligibility comprises determining based on at least one of:
inactivity,
a retention policy,
a disablement or prevention of operation of an action,
a modification, an immediate action,
an action in the future, or
a result of a file access operation; and
wherein said automatically performing said dictated action comprises at least one of:
managing said at least one file or directory according to said set of at least one file lifecycle policy;
disabling or preventing operation of said file operation based upon said at least one file lifecycle policy;
storing said at least one file or said at least one directory according to said set of at least one file lifecycle policy;
automatically moving said at least one file or said at least one directory according to said at least one file lifecycle policy associated with said at least one virtual cabinet;
automatically determining from said at least one file lifecycle policy associated with said at least one virtual cabinet, when said at least one file or said at least one directory is to be acted upon; or
automatically acting upon said at least one file or said at least one directory according to said at least one file lifecycle policy associated with said at least one virtual cabinet, whenever the at least one file lifecycle policy determines that said at least one file or said at least one directory, is to be acted upon; and
wherein, while said at least one file or said at least one directory continue to exist:
providing transparent access to said at least one file or said at least one directory regardless of where said at least one tile or said at least one directory is at least one of:
created,
located, or
moved to,
independently of an application or a user.

23. The method of managing a file lifecycle according to claim 22 wherein the determined action comprises storing in association with at least one file or at least one directory at least one expiration indicator indicative of when the at least one file or the at least one directory is to be acted upon, the at least one expiration indicator determined based on the at least one file lifecycle policy.

24. The method of managing a file lifecycle according to claim 23 wherein the at least one expiration indicator comprises at least one date on which to act upon the at least one file or the at least one directory in accordance with the at least one action dictated by the at least one file lifecycle policy from the at least one virtual cabinet.

25. The method of managing a file lifecycle according to claim 23 wherein the at least one expiration indicator comprises a minimum time before which the at least one file or the at least one directory is to be maintained in a current location.

26. The method of managing a file lifecycle according to claim 22 wherein the at least one action comprises transferring the at least one file or the at least one directory from a first location to a second location.

27. The method of managing a file lifecycle according to claim 26 wherein said transferring the at least one file or the at least one directory comprises retrieving the at least one file or the at least one directory from said first location and storing the at least one file or the at least one directory in said second location.

28. The method of managing a file lifecycle according to claim 22 comprising:
determining based on the at least one file lifecycle policy associated with the at least one virtual cabinet and based on data stored in association with the at least one file or the at least one directory whether the at least one file or the at least one directory is to be deleted;
determining based on the at least one file lifecycle policy associated with the at least one virtual cabinet and based on data stored in association with the at least one file or the at least one directory at least one mode of deletion for the at least one file or the at least one directory; and
deleting the at least one file or the at least one directory in accordance with the at least one determined mode.

29. The method of managing a file lifecycle according to claim 28 wherein the at least one mode of deletion comprises at least one of secure deletion or insecure deletion.

30. The method of managing a file lifecycle according to claim 22 wherein at least one of:
wherein the at least one file or the at least one directory acted upon according to said at least one file lifecycle policy in the virtual cabinet is acted upon within a virtual storage medium,
wherein said at least one file or said at least one directory acted upon is acted upon in a given one of said at least one virtual drawer selected from a plurality of virtual drawers, or
wherein the at least one file is acted upon on one or more similar storage media according to the at least one file lifecycle policy of said at least one virtual cabinet.

31. The method of managing a file lifecycle according to claim 30 wherein a single virtual drawer forms part of a plurality of virtual cabinets.

32. The method of managing a file lifecycle according to claim 22 wherein said determining at least one dictated action comprises:
determining from the at least one file lifecycle policy at least one condition;
evaluating the file or directory to determine a presence of the at least one condition; and, when the at least one condition is met, providing at least one dictated action associated with the at least one condition as the determined at least one dictated action, and
wherein said at least one dictated action comprises at least one of:
automatically storing said at least one file or said at least one directory according to said set of at least one file lifecycle policy;
automatically deleting said at least one file or said at least one directory when said set of at least one file lifecycle policy dictates deleting;
automatically moving said at least one file or said at least one directory when said set of at least one file lifecycle policy dictates moving;
automatically creating said at least one file or said at least one directory when said set of at least one file lifecycle policy dictates creating;
automatically classifying said at least one file or said at least one directory when said set of at least one file lifecycle policy dictates classifying;
automatically retaining said at least one file or said at least one directory when said set of at least one file lifecycle policy dictates retaining;
automatically referencing said at least one file or said at least one directory when said set of at least one file lifecycle policy dictates referencing;
automatically protecting said at least one file or said at least one directory when said set of at least one file lifecycle policy dictates protecting;

automatically securing said at least one file or said at least one directory when said set of at least one file lifecycle policy dictates securing;
automatically replicating said at least one file or said at least one directory when said set of at least one file lifecycle policy dictates replicating;
automatically backing up said at least one file or said at least one directory when said set of at least one file lifecycle policy dictates backing up;
automatically mirroring said at least one file or said at least one directory when said set of at least one file lifecycle policy dictates mirroring;
automatically load balancing said at least one file or said at least one directory when said set of at least one file lifecycle policy dictates load balancing;
automatically preserving said at least one file or said at least one directory when said set of at least one file lifecycle policy dictates preserving;
automatically erasing said at least one file or said at least one directory when said set of at least one file lifecycle policy dictates erasing;
automatically disposing of said at least one file or said at least one directory when said set of at least one file lifecycle policy dictates disposing;
modifying said at least one file operation according to said set of at least one file lifecycle policy;
managing said at least one file or directory according to said set of at least one file lifecycle policy;
disabling or preventing operation of said file operation based upon said at least one file lifecycle policy;
storing said at least one file or said at least one directory according to said set of at least one file lifecycle policy;
moving said at least one file or said at least one directory according to said at least one file lifecycle policy associated with said at least one virtual cabinet;
automatically determining from said at least one file lifecycle policy associated with said at least one virtual cabinet, when said at least one file is to be acted upon; or
automatically acting upon said at least one file or said at least one directory according to said at least one file lifecycle policy associated with said at least one virtual cabinet, whenever the at least one file lifecycle policy determines that said at least one file is to be acted upon.

33. A computer-implemented method of managing a file lifecycle, the method comprising:
associating, by at least one computer processor, a set of at least one file lifecycle policy with at least one file of at least one file system or at least one directory, wherein said at least one file lifecycle policy relates to aspects of file classification or file disposition comprising at least one of:
file operation,
file access,
file reference,
file replication,
file backup,
file mirroring,
file destruction,
file load balancing,
file erasure,
file disposal,
file expiration,
file execution,
file modification,
file deletion,
file creation,
file retention,
file reference,
file non-use,
file security,
file protection,
file preservation,
file storage locations within a storage medium,
cost effective storage of a file, or
file expiration;
automatically determining, by the at least one computer processor, an action dictated by the associated set of the at least one file lifecycle policy whenever said at least one file or said at least one directory is to be acted upon, based upon occurrence of a triggering event, wherein said triggering event comprises at least one of:
receiving a request for performing at least one file operation;
receiving at least one file operation; or
determining an eligibility based on said set of at least one file life cycle policy to act or not act upon said at least one file or said at least one directory;
automatically acting upon, by the at least one computer processor, said at least one file or said at least one directory according to the associated at least one file lifecycle policy whenever the associated set of the at least one file lifecycle policy determines that said at least one file is to be acted upon; and
wherein said at least one file comprises data stored in a virtual file-based non-volatile storage medium, said virtual file-based non-volatile storage medium comprising a file-based automated file management file system interfacing with a plurality of file system storage partitions of a plurality of corresponding physical non-volatile storage media associated therewith, locations within each physical non-volatile storage medium of said plurality of corresponding physical non-volatile storage media corresponding to locations within said virtual file-based non-volatile storage medium;
receiving, by the at least one computer processor, data for storage in said virtual file-based non-volatile storage medium using said file-based automated file management file system;
determining, by the at least one computer processor, any free space at said locations within said virtual file-based non-volatile storage medium, said free space sufficient for storing the provided data, locations having said any free space corresponding to said locations within said plurality of corresponding physical non-volatile storage media having available non-volatile storage space therein;
storing, by the at least one computer processor, the data received at said locations having said any free space; and
storing, by the at least one computer processor, index information for the stored data.

34. The method as defined in claim 33 wherein the index information comprises:
data indicative of a file identifier, and
locations within said virtual file-based nonvolatile storage medium for the stored data.

35. The method as defined in claim 33 wherein the index information comprises at least one of:
data indicative of a file identifier,
an indication of said physical non-volatile storage medium on which the stored data is stored, or
the corresponding locations within said physical non-volatile storage medium for the stored data.

36. The method as defined in claim 35 wherein some of the stored data stored within one of said physical non-volatile storage media is duplicated data of data stored in another of said physical non-volatile storage media.

37. The method as defined in claim 35 wherein a portion of the stored data less than the whole is stored on a first physical non-volatile storage medium and another portion of the stored data less than the whole is stored on a second physical non-volatile storage medium.

38. The method as defined in claim 35 wherein said first physical non-volatile storage medium and said second physical non-volatile storage medium form part of different computer systems in communication one with the other via a communication network.

39. The method as defined in claim 33 comprising:
monitoring, by the at least one computer processor, access to stored data;
determining, by the at least one computer processor, from the monitored access a location within the virtual file-based non-volatile storage medium for the stored data;
moving, by the at least one computer processor, the stored data to the determined location; and
updating, by the at least one computer processor, the index data to reflect the new storage location of the stored data being the determined location.

40. The method as defined in claim 33 comprising:
verifying, by the at least one computer processor, the presence of another physical non-volatile storage medium in communication with the virtual file-based non-volatile storage medium; and
associating, by the at least one computer processor, the other physical non-volatile storage medium with the virtual file-based non-volatile storage medium thereby dynamically increasing available non-volatile storage space on said virtual file-based non-volatile storage medium.

41. The method as defined in claim 40 comprising:
connecting, by the at least one computer processor, another computer to a computer network in communication with the virtual file-based non-volatile storage medium wherein the presence of another physical non-volatile storage medium is effected by the connection of the other computer.

42. The method as defined in claim 33 comprising:
monitoring, by the at least one computer processor, access to stored data; and
archiving, by the at least one computer processor, stored data that is not accessed for more than a predetermined amount of time.

43. The method as defined in claim 42 herein the step of archiving the stored data comprises: transferring, by the at least one computer processor, the stored data to an area within the virtual file-based non-volatile storage medium for archiving, the method comprising:
monitoring, by the at least one computer processor, access to archived data; and
transferring, by the at least one computer processor, archived data that is not accessed for more than a predetermined amount of time to a removable physical non-volatile storage media for archiving.

44. The computer-implemented method of claim 33, further comprising,
providing transparent access, by the at least one computer processor, to said at least one file or said at least one directory regardless of where said at least one file or said at least one directory is created, located, or moved to, independently of an application or a user.

* * * * *